(12) United States Patent
Ebihara et al.

(10) Patent No.: US 10,180,346 B2
(45) Date of Patent: Jan. 15, 2019

(54) WEIGHT MEASUREMENT SYSTEM AND METHOD USING ROBOT

(71) Applicant: FANUC CORPORATION, Yamanashi (JP)

(72) Inventors: Kenzo Ebihara, Yamanashi (JP); Takeshi Ooki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 154 days.

(21) Appl. No.: 15/401,518

(22) Filed: Jan. 9, 2017

(65) Prior Publication Data
US 2017/0199074 A1  Jul. 13, 2017

(30) Foreign Application Priority Data
Jan. 13, 2016  (JP) .................. 2016-004385

(51) Int. Cl.
*G01G 19/52* (2006.01)
*G01G 23/36* (2006.01)

(52) U.S. Cl.
CPC .............. *G01G 19/52* (2013.01); *G01G 23/36* (2013.01)

(58) Field of Classification Search
CPC ..................................................... G01G 19/52
See application file for complete search history.

(56) References Cited

U.S. PATENT DOCUMENTS

| | | | | |
|---|---|---|---|---|
| 3,666,032 A | * | 5/1972 | Maffia ...................... | G01G 1/24 177/256 |
| 5,606,153 A | * | 2/1997 | Fix, Sr. .................. | B25J 9/1679 177/1 |
| 8,707,753 B2 | | 4/2014 | Date | |
| 2009/0076756 A1 | | 3/2009 | Inoue | |
| 2011/0275296 A1 | * | 11/2011 | Wally .................. | A22C 11/0245 452/32 |
| 2016/0144516 A1 | * | 5/2016 | Song ........................ | B25J 19/02 414/21 |
| 2017/0047792 A1 | * | 2/2017 | Klassen ................... | H02K 1/20 |

FOREIGN PATENT DOCUMENTS

| | | |
|---|---|---|
| CN | 101387543 A | 3/2009 |
| CN | 102265123 A | 11/2011 |
| CN | 103267565 A | 8/2013 |
| JP | 03051717 A | 3/1991 |
| JP | H08-190433 A | 7/1996 |
| JP | 2011196743 A | 10/2011 |
| JP | 2011-235374 A | 11/2011 |

* cited by examiner

*Primary Examiner* — Ryan Rink
(74) *Attorney, Agent, or Firm* — RatnerPrestia

(57) ABSTRACT

A weight measurement system and a weight measurement method using a robot, by which a weight greater than a weight capacity of the robot can be measured. The system has a robot, a robot controller for controlling the motion of the robot, and an arithmetic processing unit for calculating the weight of an article to be measured. The robot is configured to apply a force to a working point connected to a tank so that at least one of support points or a part of a support surface of the tank is lifted, and simultaneously, the remaining support point or the remaining part of the support surface of the tank is grounded. The weight of the tank containing processing fluid can be measured based on a relationship between the force applied to the working point by the robot and a lever ratio.

6 Claims, 5 Drawing Sheets

CENTER OF
GRAVITY G
$x = (x1+x2)/2$
$y = (y1+y2)/2$

WEIGHT MEASUREMENT SYSTEM AND METHOD USING ROBOT

BACKGROUND OF THE INVENTION

1. Field of the Invention

The present invention relates to a weight measurement system and method, in which the weight of an article is measured by using a robot.

2. Description of the Related Art

A robot such as a multi-joint robot has a motor with a speed reducer mounted on each joint of the robot, and the weight of an article lifted by a hand of the robot can be measured (or estimated) from a load of the motor. As a relevant prior art document, JP H08-190433 A discloses a method for estimating a weight load of a hand or a tool attached to a robot or a machine tool to be controlled, driven by a servomotor, without inputting a parameter representing a mass or a position of the center of gravity from outside.

Further, JP 2011-235374 A discloses load estimation device and method for estimating a weight of a workpiece, in view of a difference between a torque command transmitted to a motor without considering the weight of the workpiece and a torque actually generated corresponding to the weight of the gripped workpiece.

Generally, a weight capacity of a robot is determined based on specifications of a speed reducer and a motor of the robot, etc. When the weight of an article lifted by the robot should be measured, the weight capacity of the robot corresponds to an upper limit of the measurable weight of the article. Therefore, when the weight of the article to be measured exceeds the weight capacity, it is necessary to use another robot having a high weight capacity. In JP H08-190433 A or JP 2011-235374 A, a means or method for measuring the weight greater than the weight capacity of the robot is not disclosed or suggested.

SUMMARY OF THE INVENTION

An object of the present invention is to provide a weight measurement system and a weight measurement method using a robot, by which a weight greater than a weight capacity of the robot can be measured.

One aspect of the present invention provides a weight measurement system for measuring a weight of an article to be measured by using a robot, the weight being supported by a plurality of grounded support points or at least one grounded support surface of the article, wherein the robot is configured to apply a force to a working point connected to the article so that at least one of the support points or a part of the support surface of the article is lifted, and simultaneously, the remaining support point or the remaining part of the support surface of the article is grounded, and wherein the weight measurement system comprises an arithmetic processing unit configured to: calculate a magnitude of the force applied to the working point based on a load of a motor provided to the robot; and calculate the weight of the article based on the magnitude of the force and a positional relationship among the working point, the remaining support point or the remaining part of the support surface, and a center of gravity of the article.

In a preferred embodiment, the weight measurement system comprises a means for detecting a position of the working point, and a means for sensing that the at least one of the support point or the part of the support surface of the article is lifted, based on the position of the working point.

In a preferred embodiment, the weight measurement system comprises a means for outputting an alarm or a signal to outside when the load of the motor exceeds or falls below a predetermined threshold which is not more than an upper limit of the load of the motor.

In a preferred embodiment, when the position of the support point or the support surface relative to the working point is unchangeable, the arithmetic processing unit calculates the weight of the article by a proportional calculation based on the load of the motor.

In a preferred embodiment, the article is a tank containing liquid, and the arithmetic processing unit calculates a weight of the liquid by subtracting a weight of the tank in an empty state from the weight of the article.

Another aspect of the present invention provides a weight measurement method for measuring a weight of an article to be measured by using a robot, the weight being supported by a plurality of grounded support points or at least one grounded support surface of the article, the method comprising the steps of: applying a force to a working point connected to the article so that at least one of the support points or a part of the support surface of the article is lifted, and simultaneously, the remaining support point or the remaining part of the support surface of the article is grounded; calculating a magnitude of the force applied to the working point based on a load of a motor provided to the robot; and calculating the weight of the article based on the magnitude of the force and a positional relationship among the working point, the remaining support point or the remaining part of the support surface, and a center of gravity of the article.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
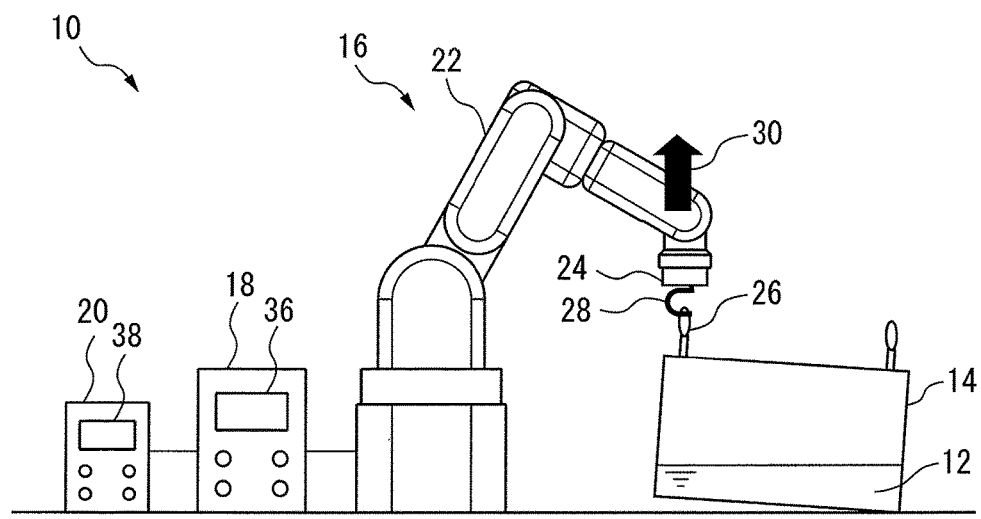
FIG. 1 is a view showing a schematic configuration of a weight measurement system according to a preferred embodiment of the present invention.

Hereinafter, a preferred embodiment of the present invention will be explained with reference to the drawings. FIG. 1 explains a state in which a weight measurement system 10 according to a preferred embodiment of the present invention is used to measure a weight of an article to be measured (in this case, a tank 14 containing liquid 12 such as processing fluid). Weight measurement system 10 has a robot 16, a robot controller 18 for controlling the motion (concretely, a motor of each axis mounted on the robot) of robot 16, and an arithmetic processing unit 20 for calculating the weight, etc., as described below. Arithmetic processing unit 20 may be incorporated in robot controller 18 as a CPU, etc. Alternatively, arithmetic processing unit 20 may be a device, such as a personal computer, separated from robot controller 18, as shown in FIG. 1.

Tank 14 has a structure in which a plurality of support points or at least one support surface of the tank are (is) grounded so as to support the weight of the tank. For example, in an example of FIG. 3 as explained below, the tank has a generally rectangular shape in a planar view, and four corners A, B, C and D correspond to the plurality of support points.

For example, robot 16 is a multi-joint robot having six axes, and has a movable part such as an arm 22 and/or a hand 24 attached to a front end of arm 22. The movable part is configured to apply a force to a working point connected to tank 14 so that at least one (in the example of FIG. 3, support points A and B) of the support points or a part of the support surface of the article are (is) lifted, and simultaneously, the remaining support point (in the example of FIG. 3, support points C and D) or the remaining part of the support surface of the article are (is) grounded. In the example of FIG. 1, a hook 28 configured to be engaged with an eyebolt 26 attached to an upper part of tank 14 is attached to the front end of robot hand 24. By upwardly moving hand 24 (in a direction of an arrow 30) while hook 28 is engaged with eyebolt 26, tank 14 is partially lifted.

Figure 2:
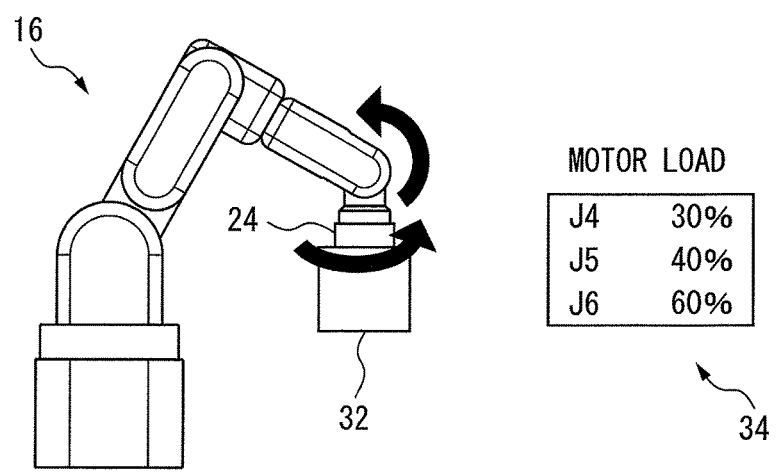
FIG. 2 is a view explaining a state in which a reference weight having a known mass is measured by the weight measurement system of FIG. 1.

FIG. 2 shows an example of a method for measuring a load weight by using robot 16. First, each axis of robot 16 is moved to the measurement position as shown in FIG. 1, and a reference weight 32 having a known mass (for example, 5 kg) is attached to hand 24. As exemplified by reference numeral 34, a motor load of each axis at this time is measured or calculated, and the motor load is stored in a proper memory, etc. In the example of FIG. 2, the motor load of a wrist axis, etc. (for example, J4, J5 and J6 axes among the six axes (J1 to J6)) robot 16 is represented as a ratio (%) relative to the maximum load capacity. In addition, such a motor load may be displayed on a displaying part 36 of robot controller 18 or a displaying part 38 of arithmetic processing unit 20.

As exemplified by reference numeral 34, by using the motor load of each axis when measuring the known weight at the certain measurement position (posture) of the robot, the force applied by the robot at the same measurement position or posture to the working point of the article can be determined or calculated. For example, when the motor loads of J4, J5 and J6 axes in the state of FIG. 1 is equal to 45%, 60% and 90%, respectively, the weight lifted by robot 16 can be calculated as 7.5 kg, in comparison to the motor load as indicated by reference numeral 34 in FIG. 2.

Further, as shown in FIG. 2, the wrist axis, etc. (for example, J4, J5 and J6) of robot 16 may be rotated while reference weight 32 is attached to robot 16, so as to determine the motor load when the same weight is measured at the different position and/or posture. By virtue of this, the force applied to the working point can be precisely measured when robot at the different position and/or posture applies the force to the working point.

Figure 3:
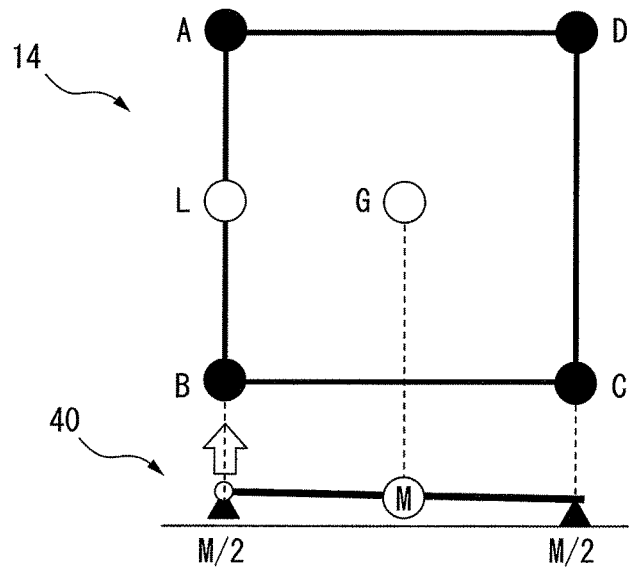
FIG. 3 is a view explaining a case in which an article to be measured has four support points positioned at respective four corners of a square in a planar view.

FIG. 3 explains a positional relationship between center of gravity G of the article to be measured (in this case, tank 14 containing processing fluid 12) and working point L to which the force for lifting a part of tank 14 is applied by robot 16, when tank 14 has four support points A, B, C and D positioned at respective four corners of a square in a planar view. In this case, working point L is positioned at an intermediate point between support points A and B. Arithmetic processing unit 20 can calculate the magnitude of the force applied to working point L based on the motor load of each axis of robot 16, and then can calculate the weight of tank 14 containing processing liquid 12 based on the calculated magnitude of the force and the positional relationship among working point L, a part of tank 14 (in this case, support points C and D) other than the lifted support point or the lifted support surface, and center of gravity G of tank 14. Hereinafter, a detailed explanation thereof will be described.

Figure 5:
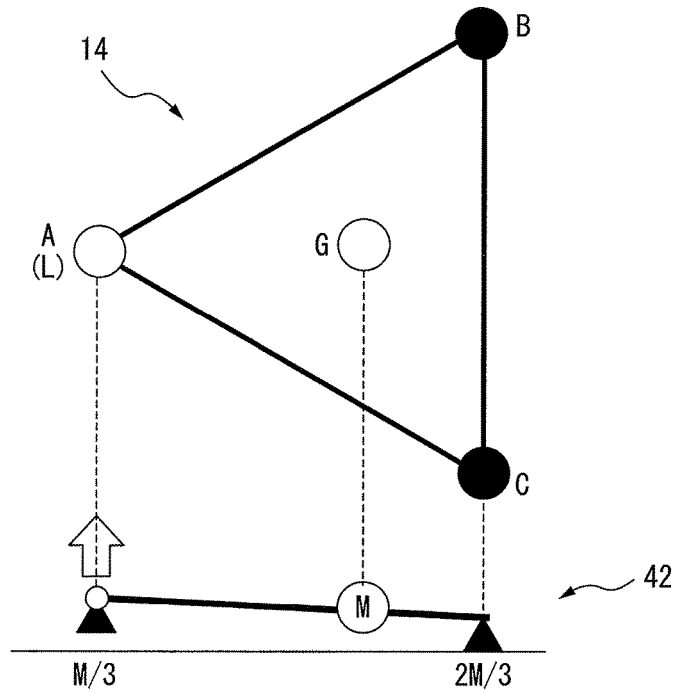
FIG. 5 is a view explaining a case in which an article to be measured has three support points positioned at respective three corners of a regular triangle in a planar view.
Figure 6:
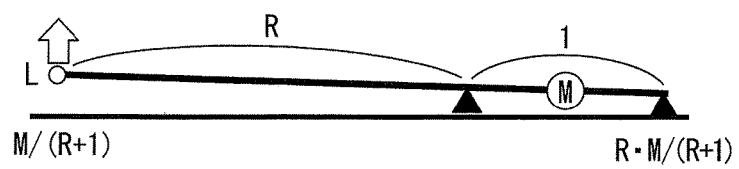
FIG. 6 is a generalized view of the working examples of FIGS. 3 and 5.

In FIG. 3, when robot 16 lifts working point L of tank 14, support points A and B are upwardly moved while support points C and D are grounded. At this point, as indicated by reference numeral 40, in view of the lever ratio, robot 16 can lift or raise the part of the article when the weight of the article is not more than twice the weight capacity of robot 16. Since the lever ratio is equal to two in the example of FIG. 3, the weight, which corresponds to twice the force applied to working point L by robot 16 (or the load for lifting the part of the article by robot 16), is determined as the weight of the article (e.g., tank 14 containing processing fluid 12). In this regard, a character "M" in FIGS. 5 and 6 represents the weight of the article (in this case, tank 14 containing processing fluid 12).

Figure 4:
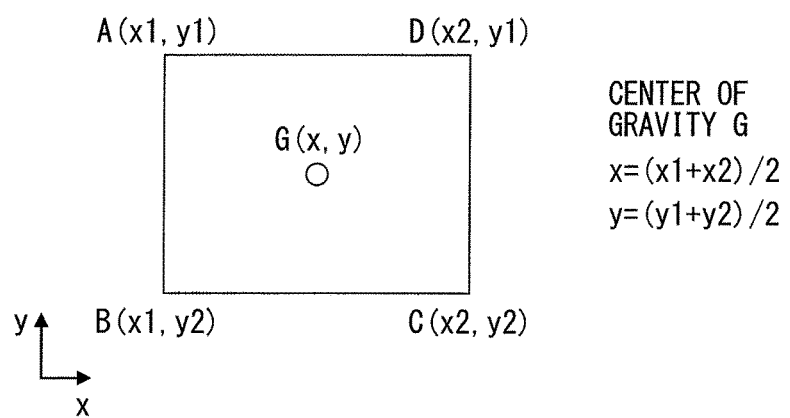
FIG. 4 is a view showing an example for calculating a center of gravity of a planar shape constituted by the support points of the article when the planar shape has a symmetrical shape such as a square or a rectangular.

FIG. 4 shows an example for calculating (a coordinate of) the center of gravity of a planar shape constituted by the support points of the article when the planar shape has a symmetrical shape such as a square or a rectangular. In the example of FIG. 4, coordinates of support points A, B, C and D are (x1, y1), (x1, y2), (x2, y2) and (x2, y1), respectively, and in this case, the coordinate of center of gravity G (x, y) can be represented by the following equations.

$$x=(x1+x2)/2$$

$$y=(y1+y2)/2$$

FIG. 5 shows a modification of FIG. 3, and explains a case in which the article to be measured has three support points positioned at respective three corners of a regular triangle in a planar view. In the example of FIG. 5, when robot 16 lifts working point L of tank 14 (in this case, the working point is the same as support point A), support point A among the three support points is upwardly moved while the remaining support points (B and C) are grounded. At this point, as indicated by reference numeral 42, in view of the lever ratio, robot 16 can lift or raise the part of the article when the weight of the article is not more than thrice the weight capacity of robot 16. Since the lever ratio is equal to three in the example of FIG. 5, the weight, which corresponds to thrice the force applied to working point L by robot 16 (or the load for lifting the part of the article by robot 16), is determined as the weight of the article (e.g., tank 14 containing processing fluid 12).

FIG. 6 is a generalized view of the working examples of FIGS. 3 and 5. As shown in FIG. 6, depending on the shape of the article and positions of the center of gravity and the working point, etc., the lever ratio can be set to an arbitrary value. Concretely, the lever ratio is increased as gripped position (or working point) L is moved away from center of gravity position M of the article, whereby the robot can lift part of the article having the relatively heavy weight. For example, length R is equal to one in the example of FIG. 3, and length R is equal to two in the example of FIG. 5.

In the embodiment, the position of working point L (or the gripped position of tank 14 by robot 16) can be detected from a rotational angular position, etc., of the motor of each axis of the robot. For example, the rotational angular position of each motor can be measured by an encoder associated with each motor. When the position of the working point is changed (or is upwardly displaced), robot controller 18 or arithmetic processing unit 20 may judge that the part of the article is lifted. Therefore, in the embodiment, the weight of the article can be measured based on the motor load and the positions of the working point and the center of gravity when the part of the article is lifted. In this regard, when the position of the center of gravity of the article may be significantly changed by lifting the part of the article (for example, when the article is the tank containing the liquid), it is preferable that an amount of lifting of the article be small as possible. Concretely, it is preferable that the weight of the article be measured at the moment when or immediately after the part of the article is lifted.

Figure 7:
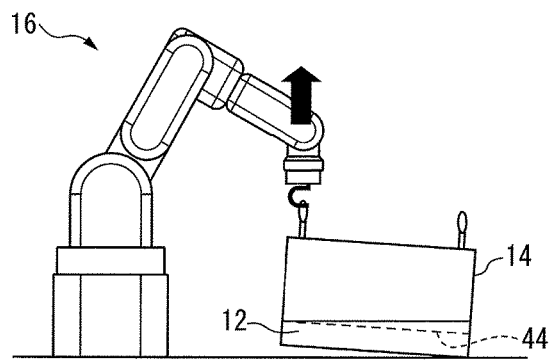
FIG. 7 is a view exemplifying a state in which a volume of processing fluid within a tank is relatively small.

FIG. 7 is shows an example in which the motor load of each axis of robot 16 has a threshold not more than an upper limit of the motor load, and an alarm signal is output when the motor load at the time of the weight measurement falls below the threshold. In detail, when the motor load at the time when robot 16 lifts the part of tank 14 containing processing fluid 12 falls below the threshold, it can be judged that the volume of processing fluid 12 within tank 14 is significantly reduced. Then, robot controller 18 or arithmetic processing unit 20 may transmit an alarm or signal to a processing machine, etc., which uses processing fluid 12, so that the processing fluid is supplied to tank 14. Concretely, a lower limit volume 44 for processing fluid 12 within tank 14 is predetermined, and the threshold is set as the motor load when the weight of tank 14 containing processing fluid 12 the volume of which corresponds to lower limit volume 44 or a volume obtained by adding a predetermined margin to the lower limit volume. By virtue of this, a problem that the motion of the processing machine is stopped due to the shortage of processing fluid 12, etc., can be obviated. Further, when the weight is measured by the robot in order to only compare the weight to the threshold, it is sufficient that the weight capacity of the robot is slightly greater than the weight corresponding to the threshold.

Figure 8:
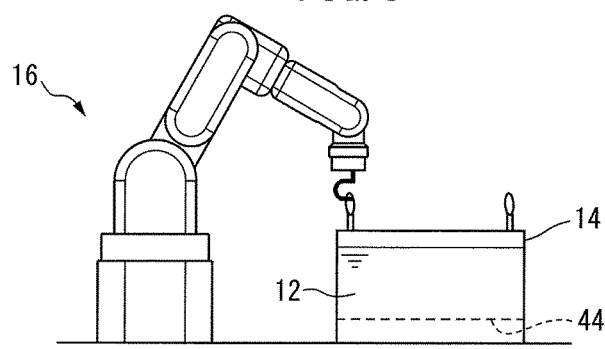
FIG. 8 is a view exemplifying a state in which the processing fluid is sufficiently contained within the tank.

On the other hand, FIG. 8 is shows an example in which the motor load of each axis of robot 16 has a threshold equal to or close to the upper limit of the motor load, and an alarm signal is output when the motor load at the time of the weight measurement exceeds the threshold. In detail, when the motor load at the time when robot 16 lifts the part of tank 14 containing processing fluid 12 exceeds the threshold, robot controller 18 or arithmetic processing unit 20 may transmit an alarm or signal to the outside, which represents that the weight of the article cannot be measured due to the overload. In this case, it can be judged that the volume of processing fluid 12 within tank 14 is sufficient, and thus the processing machine, etc., which uses the processing fluid 12, can continue a predetermined operation without supplying the fluid to the tank.

In the examples of FIGS. 7 and 8, when the weight of tank 14 only (or the empty tank) has been previously measured, the weight or volume of processing fluid 12 only within tank 14 can be measured, by subtracting the weight of the empty tank from the measurement value.

Figure 9:
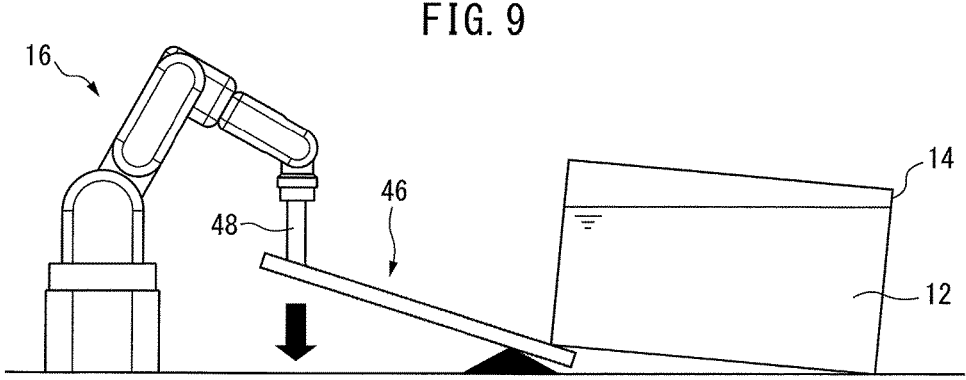
FIG. 9 is a view exemplifying a state in which a robot lifts a part of the article by pushing down a lever.

FIG. 9 explains an example of a means for increasing an upper limit of the measurable weight of the article, without increasing the weight capacity of robot 16. In the example of FIG. 9, a lever 46 is used to measure the weight of tank 14 containing processing fluid 12. Concretely, robot 16 has a (for example, rod-like) pressing member 48 at the front end of the movable part of the robot, and is configured to press pressing member 48 against one end (in the drawing, a left end) of lever 46 from the above, whereby the part (or the working point) of tank 14 mounted on the other (right) end of lever 46 can be lifted. In this case, robot 16 performs the push-down motion also using its own weight, instead of the lifting motion, and thus a large force can be applied to lever 46. Further, by appropriately setting the lever ratio of lever 46, the weight of a relatively heavy article can be measured.

Figure 10:
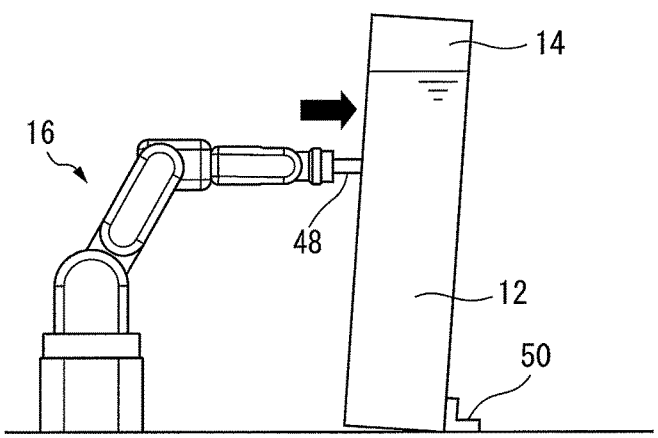
FIG. 10 is a view exemplifying a state in which the robot lifts a part of the article by pushing a lateral side of the tank.

FIG. 10 explains a state in which the part of tank 14 is upwardly moved by pushing tank 14 in the lateral direction by robot 16. In detail, robot 16 has a (for example, rod-like) pressing member 48 at the front end of the movable part of the robot, and is configured to press pressing member 48 against the lateral side of tank 14, whereby tank 14 is inclined and the part of tank 14 is lifted. Also in this case, the magnitude of the force applied to the working point can be calculated based on the motor load of each axis of robot 16, and the weight of tank 14 containing processing fluid 12 can be calculated based on the magnitude of the force and the positional relationship among the working point, the support point or the part of the support surface other than the lifted support point or the lifted support surface of tank 14, and the center of gravity of tank 14. In this regard, as shown in FIG. 10, a stopper 50, which contacts a lower end portion of tank 14 opposed to the side pushed by robot 16, may be arranged on a mounting surface of tank 14, in order to prevent tank 14 from sliding on the mounting surface when tank 14 is pushed in the lateral direction.

Figure 11:
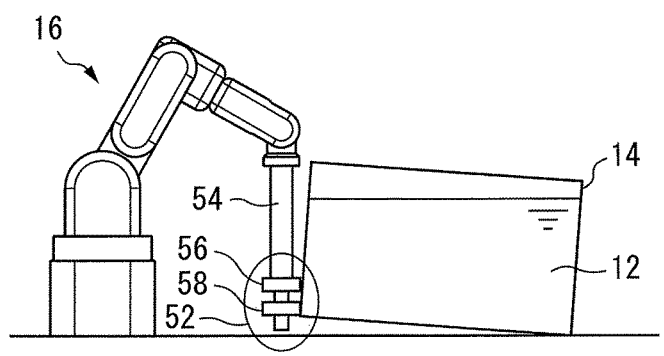
FIG. 11 is a view exemplifying a state in which a robot lifts a part of the article by using a combination of a bolt and a nut.
Figure 12:
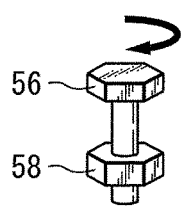
FIG. 12 is a partial enlarged view of FIG. 11.

FIG. 11 explains a state in which the part of tank 14 is lifted by using a combination of a bolt and a nut so as to measure the weight of tank 14, and FIG. 12 is a partial enlarged view of a section 52 of FIG. 11. In detail, a bolt 56 is fixed to a rotating member 54 rotatably attached to the front end of the movable part (e.g., hand 12) of the robot, and a nut 58 is fixed to the lower end of portion of tank 14. By engaging bolt 56 to nut 58 and then by rotating bolt 56 relative to nut 58, nut 58 can be upwardly displaced, whereby the part of tank 14 can be lifted or raised. In this case, a large lifting force can be generated since the rotational motion is converted into the linear motion. By previously determining a relationship between an amount of rotation of bolt 56 and a weight ratio, the weight of tank 14 containing processing fluid 12 can be measured.

As explained with reference to FIGS. 9 to 12, the motion of the robot is not limited to the lifting of the part of the article to be measured. For example, the motion may include the pushing the article in the downward or lateral direction. In other words, any motion for applying the force to the article may be used as long as the part of the article is lifted or raised as a result of the motion.

In the above embodiment, when the position of the support point or the support surface relative to the working point is unchanged (i.e., when the shape of the article is unchanged), the motor load is proportional to the weight of the article. In this case, arithmetic processing unit 20 can calculate the weight of the article by a simple proportional calculation.

Although FIGS. 3 and 5 explain that the article (tank 14) has the plurality of support points, the present application can be also applied when tank 14 has a support surface having a certain area.

In the embodiment, when the robot lifts a part (or one point) of the article or applies the force to the article, the weight of the article can be measured based on the motor load of each axis of the robot and the position of the center of gravity of the article, without completely lifting the article. Therefore, the weight greater than the weight capacity of the robot can also be measured.

According to the present invention, when the robot partially lifts the article to be measured, the weight of the article can be measured based on the motor load and the position of the center of gravity of the article. Therefore, the weight greater than the load capacity of the robot can also be measured.

While the invention has been described with reference to specific embodiments chosen for the purpose of illustration, it should be apparent that numerous modifications could be made thereto, by a person skilled in the art, without departing from the basic concept and scope of the invention.

The invention claimed is:

1. A weight measurement system for measuring a weight of an article to be measured by using a robot and a lever, the weight being supported by a plurality of grounded support points or at least one grounded support surface of the article, wherein the robot is configured to push-down one end of the lever so as to lift a working point of the article mounted on the other end of the lever so that at least one of the support points or a part of the support surface of the article is lifted, and simultaneously, the remaining support point or the remaining part of the support surface of the article is grounded, and wherein the weight measurement system comprises an arithmetic processing unit configured to: calculate a magnitude of a force applied to the working point based on a load of a motor provided to the robot; and calculate the weight of the article based on the magnitude of the force and a positional relationship among the working point, the remaining support point or the remaining part of the support surface, and a center of gravity of the article.

2. The weight measurement system as set forth in claim 1, wherein the weight measurement system comprises a means for detecting a position of the working point, and a means for sensing that the at least one of the support point or the part of the support surface of the article is lifted, based on the position of the working point.

3. The weight measurement system as set forth in claim 1, wherein the weight measurement system comprises a means for outputting an alarm or a signal to outside when the load of the motor exceeds or falls below a predetermined threshold which is not more than an upper limit of the load of the motor.

4. The weight measurement system as set forth in claim 1, wherein, when the position of the support point or the support surface relative to the working point is unchangeable, the arithmetic processing unit calculates the weight of the article by a proportional calculation based on the load of the motor.

5. The weight measurement system as set forth in claim 1, wherein the article is a tank containing liquid, and the arithmetic processing unit calculates a weight of the liquid by subtracting a weight of the tank in an empty state from the weight of the article.

6. A weight measurement method for measuring a weight of an article to be measured by using a robot and a lever, the weight being supported by a plurality of grounded support points or at least one grounded support surface of the article, the method comprising the steps of:
pushing-down one end of the lever so as to lift a working point of the article mounted on the other end of the lever so that at least one of the support points or a part of the support surface of the article is lifted, and simultaneously, the remaining support point or the remaining part of the support surface of the article is grounded;
calculating a magnitude of a force applied to the working point based on a load of a motor provided to the robot; and
calculating the weight of the article based on the magnitude of the force and a positional relationship among the working point, the remaining support point or the remaining part of the support surface, and a center of gravity of the article.

* * * * *